United States Patent
Tsunekawa et al.

(10) Patent No.: US 9,561,850 B2
(45) Date of Patent: Feb. 7, 2017

(54) VERTICAL TAKE-OFF AND LANDING AIRCRAFT

(71) Applicant: IHI CORPORATION, Tokyo (JP)

(72) Inventors: Masayoshi Tsunekawa, Tokyo (JP); Tetsuya Tamura, Tokyo (JP)

(73) Assignee: IHI CORPORATION (JP)

( * ) Notice: Subject to any disclaimer, the term of this patent is extended or adjusted under 35 U.S.C. 154(b) by 472 days.

(21) Appl. No.: 14/142,403

(22) Filed: Dec. 27, 2013

(65) Prior Publication Data

US 2014/0110533 A1   Apr. 24, 2014

Related U.S. Application Data

(63) Continuation of application No. PCT/JP2012/066745, filed on Jun. 29, 2012.

(30) Foreign Application Priority Data

Jun. 30, 2011  (JP) .................. 2011-145525

(51) Int. Cl.
  *B64C 29/00* (2006.01)
  *B64C 27/20* (2006.01)
  *B64C 27/52* (2006.01)

(52) U.S. Cl.
  CPC ........... *B64C 29/0033* (2013.01); *B64C 27/20* (2013.01); *B64C 27/52* (2013.01)

(58) Field of Classification Search
  CPC .... B64C 29/0033; B64C 39/026; B64C 13/04; B64C 31/04
  See application file for complete search history.

(56) References Cited

U.S. PATENT DOCUMENTS

| | | | | |
|---|---|---|---|---|
| 1,867,759 A | * | 7/1932 | Rehbock ................. | B64C 27/08 244/64 |
| 2,180,922 A | * | 11/1939 | De Bothezat ........... | B64C 27/04 244/17.23 |

(Continued)

FOREIGN PATENT DOCUMENTS

| JP | 59-501202 A | 7/1984 |
|---|---|---|
| JP | 3-91895 | 9/1991 |

(Continued)

OTHER PUBLICATIONS

Written Opinion and International Search Report issued on Oct. 2, 2012 in corresponding International Patent Application No. PCT/JP2012/066745. (English Translation Provided).

*Primary Examiner* — Justin Rephann
(74) *Attorney, Agent, or Firm* — Volpe and Koenig, P.C.

(57) ABSTRACT

A vertical take-off and landing aircraft includes a propulsion mechanism having a fan for generating lift and thrust, an engine for supplying motive power to the propulsion mechanism, a frame coupling the propulsion mechanism and the engine, seating connected to and suspended from the frame so as to be swingable back and forth relative to the frame, a control stick connected to the frame, and a landing undercarriage connected to the seating, wherein the propulsion mechanism is connected to the frame such that the drive shaft of the fan is directed vertically during landing, and the frame is moved relative to the seating by manipulating the control stick, to change the orientation of the propulsion mechanism. The thrust can be controlled with simple configuration, and take-off and landing can be performed safely even in a small space surrounded by obstacles.

6 Claims, 30 Drawing Sheets

(56) References Cited

U.S. PATENT DOCUMENTS

| | | | | |
|---|---|---|---|---|
| 2,417,896 A * | 3/1947 | Zimmerman | ......... | B64C 39/026 244/17.15 |
| 2,486,059 A * | 10/1949 | Pentecost | ................ | B64C 27/10 244/17.11 |
| 3,029,047 A * | 4/1962 | Jacobsen | ................ | B64C 1/063 244/17.11 |
| 3,272,457 A * | 9/1966 | MacMillan | ........... | B64C 39/026 244/17.11 |
| 3,321,022 A * | 5/1967 | Oguri | ................ | B64C 29/0033 244/20 |
| 3,426,982 A * | 2/1969 | Markwood | ............ | B64C 27/28 244/17.19 |
| 3,578,875 A * | 5/1971 | Oguri | ................ | B64C 29/0016 416/109 |
| 4,537,372 A * | 8/1985 | Forizs | ................ | B64C 29/0033 244/12.4 |
| 5,601,257 A * | 2/1997 | McKann | ................ | B64C 27/10 244/17.19 |
| 5,779,188 A * | 7/1998 | Frick | .................... | B64C 39/026 244/12.5 |
| 5,996,933 A * | 12/1999 | Schier | ................ | B64C 27/10 244/17.11 |
| 6,892,980 B2 * | 5/2005 | Kawai | ................... | B64C 11/001 244/12.4 |
| 7,198,223 B2 * | 4/2007 | Phelps, III | .............. | B64C 27/10 244/17.11 |
| 7,484,687 B2 * | 2/2009 | Martin | ................ | B64C 15/00 244/4 A |
| 7,644,887 B2 * | 1/2010 | Johnson | ................ | B64C 27/10 244/17.19 |
| 7,959,104 B2 * | 6/2011 | Kuntz | ................... | A63H 17/00 244/2 |
| 8,167,234 B1 * | 5/2012 | Moore | ................... | B64C 37/00 244/17.23 |
| 2002/0003188 A1 * | 1/2002 | Moshier | ................ | B64C 39/026 244/4 R |
| 2002/0113165 A1 * | 8/2002 | Moshier | ................ | B64C 39/026 244/4 A |
| 2005/0098682 A1 * | 5/2005 | Pai | .......................... | B64C 27/10 244/17.11 |
| 2005/0230524 A1 * | 10/2005 | Ishiba | ................ | B64C 29/0025 244/23 A |
| 2009/0224095 A1 * | 9/2009 | Cox | ........................ | B64C 27/20 244/17.23 |
| 2009/0304504 A1 * | 12/2009 | Ishiba | .................. | B64C 11/001 415/211.2 |
| 2011/0133037 A1 * | 6/2011 | Martin | .................. | B64C 39/026 244/4 A |
| 2011/0139939 A1 * | 6/2011 | Martin | ................... | B64D 33/10 244/23 A |
| 2012/0091257 A1 * | 4/2012 | Wolff | ................... | B64C 29/0033 244/12.4 |
| 2012/0298790 A1 * | 11/2012 | Bitar | ....................... | B64C 27/12 244/17.11 |
| 2015/0053826 A1 * | 2/2015 | Tsunekawa | ......... | B64C 29/0033 244/23 A |
| 2015/0197337 A1 * | 7/2015 | Tsunekawa | ............ | B64C 27/20 244/23 A |

FOREIGN PATENT DOCUMENTS

| | | |
|---|---|---|
| JP | 06-092294 A | 4/1994 |
| JP | 2005-206015 | 8/2005 |
| JP | 2006-015971 A | 1/2006 |
| JP | 4223921 B2 | 2/2009 |
| JP | 2009-137319 A | 6/2009 |

\* cited by examiner

VERTICAL TAKE-OFF AND LANDING AIRCRAFT

TECHNICAL FIELD

The present invention relates to vertical take-off and landing aircraft, and more particularly, to a vertical take-off and landing aircraft capable of generating lift without running on the ground.

BACKGROUND ART

Currently, helicopter is a typical example of vertical take-off and landing aircraft capable of generating lift without running on the ground. A helicopter has a large rotor, compared with its fuselage, and generates lift and thrust by rotating the rotor. There have also been known, though few in number of types, fixed-wing aircraft that perform vertical take-off and landing by changing the direction of the thrust derived from jet engines.

The fuselage of a helicopter has a relatively large size itself, and in addition, the helicopter is equipped with a main rotor larger in size than the fuselage and a tail rotor at the tail of the fuselage. Thus, if take-off, landing or attitude control is performed in a small space surrounded by obstacles such as buildings or trees, the main rotor or the tail rotor may come into contact with the obstacles. Accordingly, a large space needed for the take-off and landing.

In the case of a fixed-wing aircraft capable of vertical take-off and landing using jet engines, the jet exhaust is high in temperature and also the exhaust emission is large in volume. Accordingly, small objects such as stones are blown off by the jet exhaust during take-off or landing, possibly damaging surrounding buildings or the like. Thus, also in the case of the fixed-wing aircraft, a large space is needed for the take-off and landing.

There have already been proposed vertical take-off and landing (VTOL) aircraft capable of safe take-off and landing even in a small space (see Patent Documents 1 and 2, for example). The vertical take-off and landing aircraft disclosed in Patent Documents 1 and 2 are equipped with ducted fans having propeller type fans arranged within cylindrical ducts or nacelles.

CITATION LIST

Patent Literature

Patent Document 1: Unexamined Japanese Patent Publication No. 2005-206015
Patent Document 2: Unexamined Japanese Patent Publication No. 2006-056364

SUMMARY OF INVENTION

Technical Problem

However, the conventional vertical take-off and landing aircraft equipped with ducted fans require a complicated method for controlling the thrust. For example, it is necessary to additionally provide control vanes or the fans alone need to be tilted by actuators or the like, with the result that the aircraft tend to be priced high.

The present invention was created in view of the above problem, and an object thereof is to provide a vertical take-off and landing aircraft of which thrust can be controlled with simple configuration and which is capable of safe take-off and landing even in a small space surrounded by obstacles.

Solution to Problem

The present invention provides a vertical take-off and landing aircraft comprising: a propulsion mechanism including a fan configured to generate lift and thrust; an engine configured to supply motive power to the propulsion mechanism; a frame coupling the propulsion mechanism and the engine; seating connected to and suspended from the frame so as to be swingable back and forth relative to the frame; a control stick connected to the frame; and a landing undercarriage connected to the frame or the seating, wherein the propulsion mechanism is connected to the frame such that a drive shaft of the fan is directed vertically during landing, and the frame is moved relative to the seating by manipulating the control stick, to change orientation of the propulsion mechanism.

Preferably, the seating includes a front seat unit and a rear seat unit.

Also, preferably, the frame has a pivot shaft extending in a horizontal direction, and the seating has a tubular member through which the pivot shaft is inserted.

Further, preferably, the propulsion mechanism includes a left fan arranged on the left side of the seating, and a right fan arranged on the right side of the seating.

Preferably, moreover, the propulsion mechanism further includes a rear fan arranged at the back of the seating.

Preferably, the propulsion mechanism is arranged above or below the seating.

Also, preferably, the propulsion mechanism is arranged in an adjacent position.

Further, preferably, the propulsion mechanism is a ducted fan.

Advantageous Effects of Invention

In the vertical take-off and landing aircraft according to the present invention, the seating is connected to the frame to which the propulsion mechanism is coupled, so as to be swingable back and forth relative to the frame, and therefore, by just moving (swinging) the frame relative to the seating, the orientation of the propulsion mechanism can be easily changed so that lift and thrust may appropriately act upon the fuselage. Consequently, the thrust can be controlled with simple configuration, and take-off and landing can be performed safely even in a small space surrounded by obstacles.

Where the seating includes a front seat unit and a rear seat unit to allow two persons to board, the front seat unit may be used as a pilot's seat and the rear seat unit may be used for placing goods or seating a rescuer or guard.

DESCRIPTION OF EMBODIMENTS

Figure 1A:
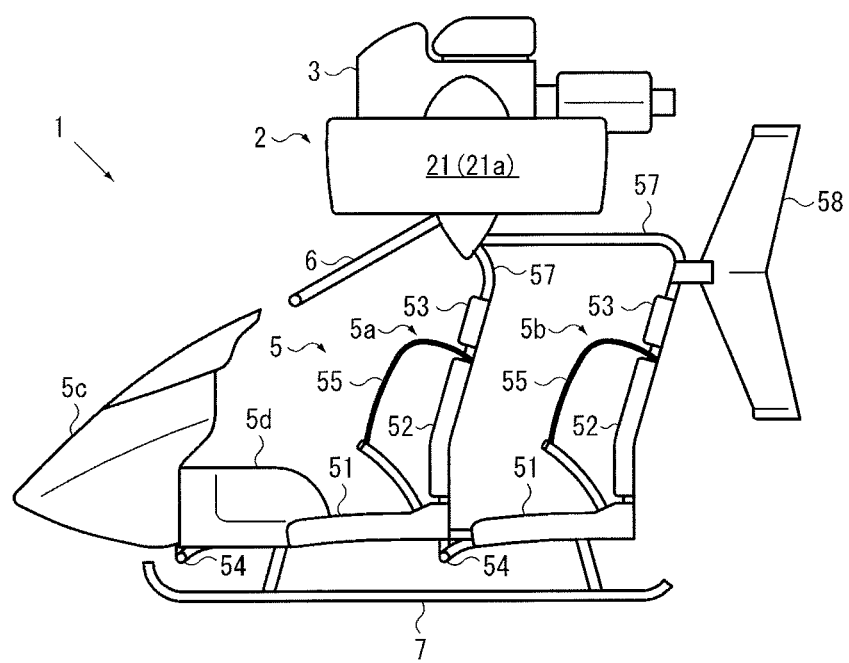
FIG. 1A is a side view showing an entire fuselage of a vertical take-off and landing aircraft according to a first embodiment of the present invention.
Figure 1B:
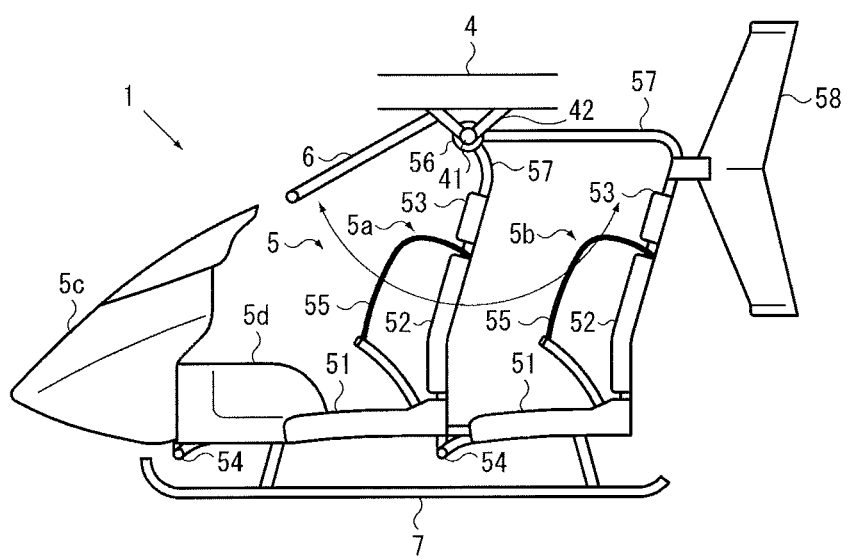
FIG. 1B is a side view showing the positional relationship of seating and a frame of the vertical take-off and landing aircraft according to the first embodiment of the present invention.
Figure 1C:
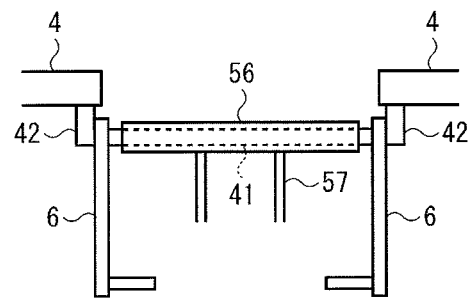
FIG. 1C is an enlarged view of a hinge section of the vertical take-off and landing aircraft according to the first embodiment of the present invention.
Figure 2A:
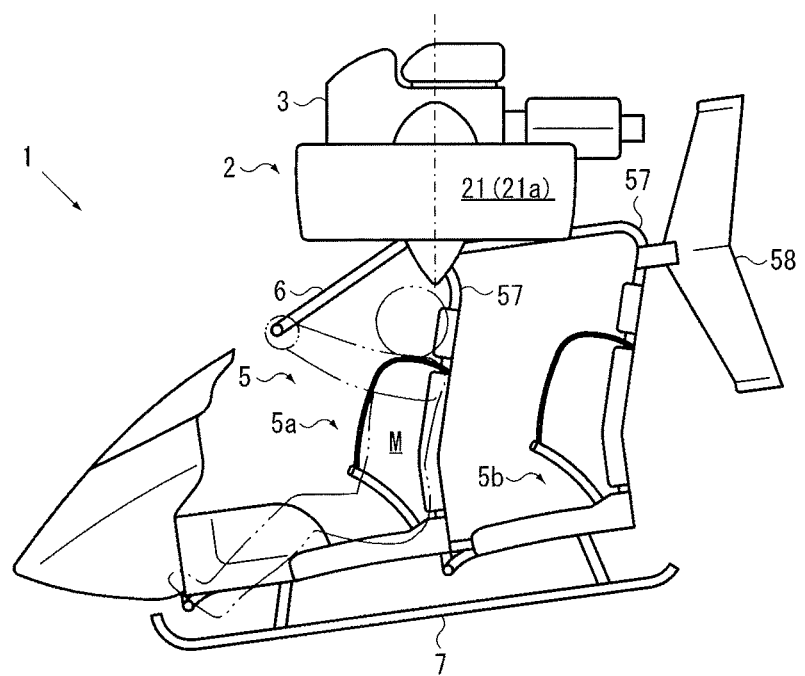
FIG. 2A is a side view illustrating a hovering state of the vertical take-off and landing aircraft shown in FIGS. 1A to 1C.
Figure 2B:
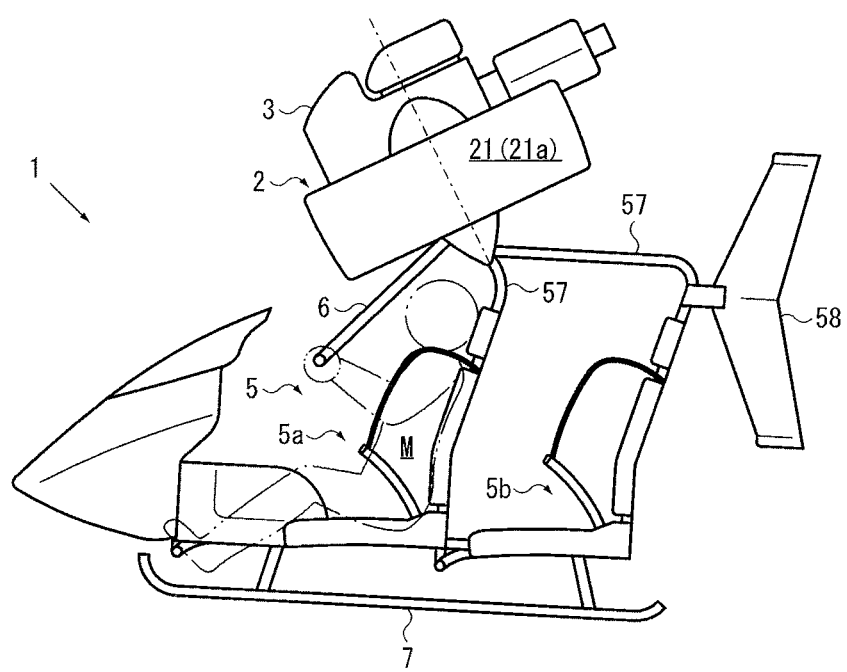
FIG. 2B is a side view illustrating a forward flight state of the vertical take-off and landing aircraft shown in FIGS. 1A to 1C.
Figure 3A:
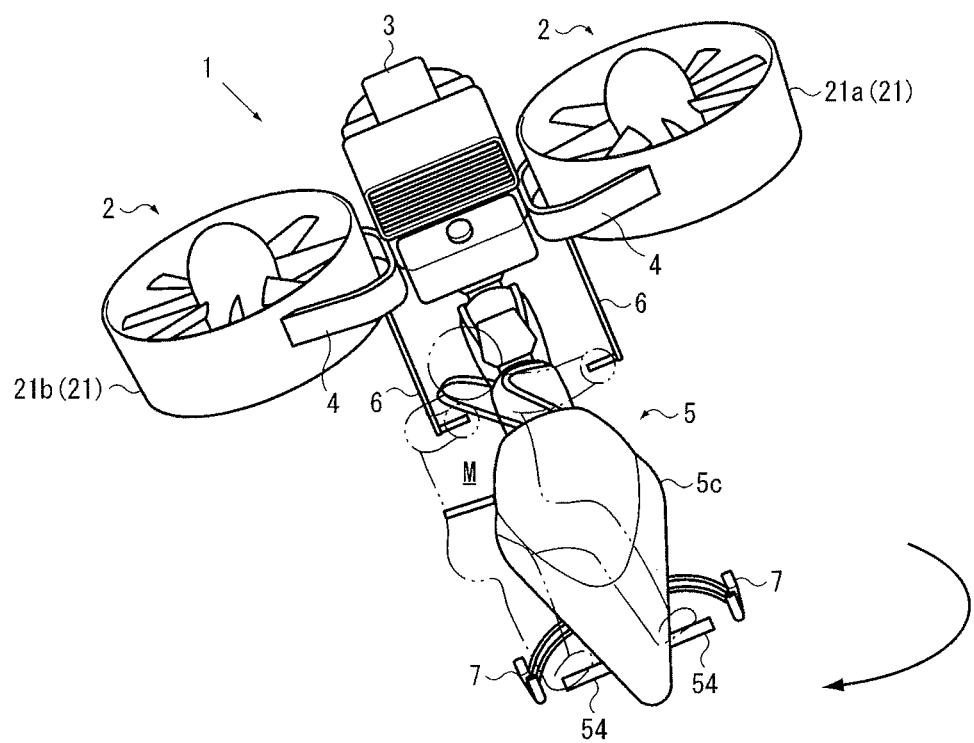
FIG. 3A is a front view illustrating a right turning state of the vertical take-off and landing aircraft shown in FIGS. 1A to 1C, as viewed from above.
Figure 3B:
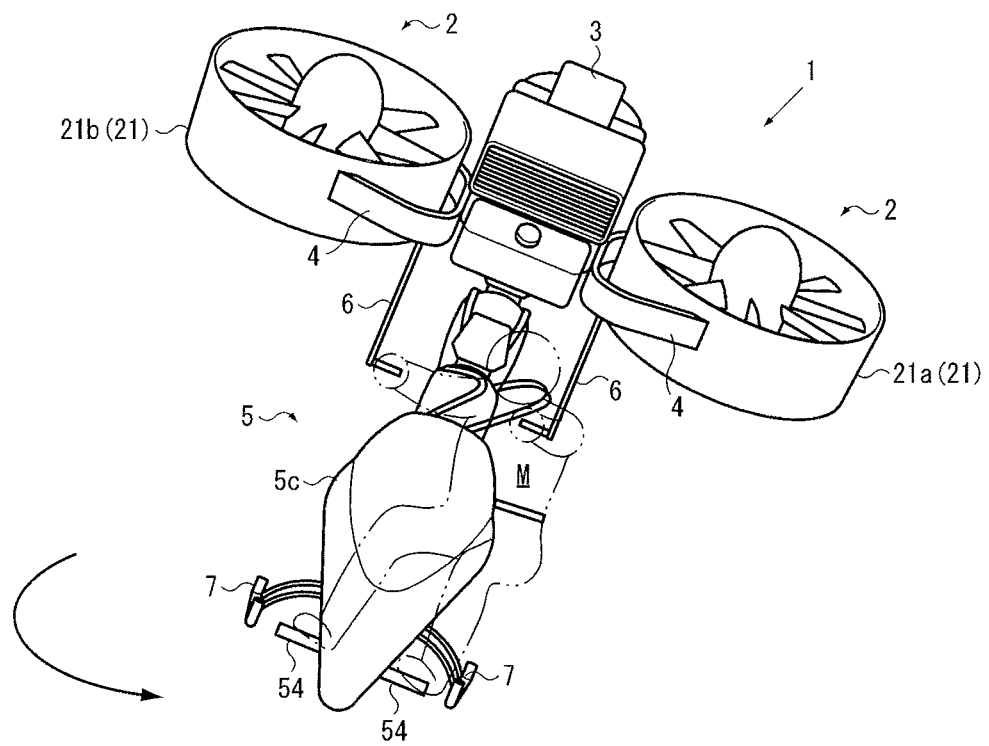
FIG. 3B is a front view illustrating a left turning state of the vertical take-off and landing aircraft shown in FIGS. 1A to 1C, as viewed from above.

Embodiments of the present invention will be described below with reference to FIGS. 1A through 11B. FIGS. 1A to 1C illustrate a vertical take-off and landing aircraft according to a first embodiment of the present invention, wherein FIG. 1A is a side view showing an entire fuselage, FIG. 1B is a side view showing the positional relationship of seating and a frame, and FIG. 1C is an enlarged view of a hinge section. FIGS. 2A and 2B illustrate flight states of the vertical take-off and landing aircraft shown in FIGS. 1A to 1C, wherein FIG. 2A is a side view showing a hovering state, and FIG. 2B is a side view showing a forward flight state. FIGS. 3A and 3B illustrate flight states of the vertical take-off and landing aircraft shown in FIGS. 1A to 1C, wherein FIG. 3A is a front view of the aircraft making a right turn, as viewed from above, and FIG. 3B is a front view of the aircraft making a left turn, as viewed from above. In FIGS. 3A and 3B, the right- and left-hand parts of the figures correspond to the left and right sides, respectively, of the fuselage.

As illustrated in FIGS. 1A to 3B, the vertical take-off and landing aircraft 1 according to the first embodiment of the present invention includes a propulsion mechanism 2 having fans 21 for generating lift and thrust, an engine 3 configured to supply motive power to the propulsion mechanism 2, a frame 4 coupling the propulsion mechanism 2 and the engine 3, seating 5 connected to and suspended from the frame 4 so as to be swingable back and forth relative to the frame 4, control sticks 6 connected to the frame 4, and a landing undercarriage 7 connected to the seating 5. The propulsion mechanism 2 is connected to the frame 4 such that the drive shafts of the fans 21 are directed vertically during landing, and the frame 4 is moved relative to the seating 5 by manipulating the control sticks 6, to change the orientation of the propulsion mechanism 2.

The propulsion mechanism 2 includes two fans 21 arranged on both sides of the engine 3, respectively. Specifically, the fans 21 include a left fan 21a located on the left side of the seating 5, and a right fan 21b located on the right side of the seating 5. The fans 21 (left and right fans 21a and 21b) are each constituted by a ducted fan, for example. The propulsion mechanism to be used is, however, not limited to ducted fans and may be propellers, ejectors or the like. Also, as shown in FIG. 1A, the propulsion mechanism 2 is arranged above the seating 5, by way of example.

The engine 3 is a drive source from which motive power is transmitted to the fans 21 (left and right fans 21a and 21b). The engine 3 may, for example, be an electric motor or reciprocating engine and may be equipped with a supercharger. A power transmission mechanism for transmitting the motive power from the engine 3 to the individual fans 21 may have an appropriate configuration suited to the arrangement and structure of the individual devices. For example, the power transmission mechanism includes a bevel gear coupled to the distal end of the output shaft of the engine 3, a pair of shafts each having bevel gears at opposite ends thereof, and bevel gears coupled to the respective drive shafts of the fans 21 so that rotation of the output shaft may be transmitted to the drive shafts through the bevel gears. The power transmission mechanism may employ a different gear mechanism from the aforementioned one and may have a speed reducer incorporated therein. Where the rotating speed of the fans 21 is to be controlled separately from each other, the fans 21 may be connected to respective different engines 3.

As seen from FIGS. 3A and 3B, the frame 4 is a component part coupling the engine 3 and the left and right fans 21a and 21b. It is to be noted that in FIG. 1B, illustration of the engine 3 and fans 21 is omitted. As illustrated in FIGS. 1B and 1C, the frame 4 has a pivot shaft 41 extending in a horizontal direction and coupled to the frame 4 by supporting members 42. The supporting members 42 may be omitted if the pivot shaft 41 can be directly coupled to the frame 4. Preferably, the pivot shaft 41 is arranged in a position coinciding with the point of action of lift generated by the fans 21, for example.

The seating 5 includes, as illustrated in FIG. 1A for example, a seat 51 on which an occupant sits, a backrest 52 for supporting the occupant's back, a headrest 53 for supporting the occupant's head, a footrest 54 on which the occupant rests his/her feet, and a seat belt 55 for holding the occupant in the seat 51. The seating 5 is made up of a front seat unit 5a and a rear seat unit 5b. The front seat unit 5a is a seat on which the pilot sits, and the rear seat unit 5b is a seat on which a rescuer or guard sits. Alternatively, the rear seat unit 5b may be used as a space for placing goods. Also, the front seat unit 5a is connected at its front with a cowl 5c for directing airflow. Part of the cowl 5c is made of a transparent member in order to ensure the visual field of the pilot. A junction 5d between the front seat unit 5a and the cowl 5c may be used to accommodate a console box or a control section where operating switches and levers for controlling the engine 3 are arranged.

Also, the seating 5 has a tubular member 56 through which the pivot shaft 41 connected to the frame 4 is inserted. The front and rear seat units 5a and 5b have supporting frames 57, respectively, and the supporting frames 57 are coupled to the tubular member 56. The pivot shaft 41 of the frame 4 and the tubular member 56 of the seating 5 constitute a hinge, so that the frame 4 and the seating 5 are swingable about the pivot shaft 41, that is, movable relative to each other. The seating 5 is suspended from the pivot shaft 41, and the weight distribution of the seating 5 in the front-back or longitudinal direction is adjusted so that the seating 5 can usually keep an attitude parallel to the ground, that is, the front and rear seat units are horizontally balanced. Also, balance weights may be suitably added or removed for balance adjustment in accordance with the superimposed load in flight each time the need arises, for example, depending on whether the aircraft flies with one person or two persons aboard. A tail fin 58 may be attached to the supporting frame 57 of the rear seat unit 5b.

The control sticks 6 are connected to the frame 4 so as to extend obliquely downward from the frame 4. As illustrated in FIGS. 1B and 1C, the control sticks 6 may be connected to the respective supporting members 42. With this configuration, as the occupant (pilot) seated on the front seat unit 5a moves the control sticks 6 toward or away from his/her body, the frame 4 can be moved (swung) relative to the seating 5, so that the orientation of the propulsion mechanism 2 (angle of the drive shafts of the fans 21 with respect to the pitch angle) can be changed.

The landing undercarriage 7 is a component part that touches the ground during landing. As illustrated in FIG. 1A, the landing undercarriage 7 is connected to the underside of the seating 5, by way of example. Also, as seen from FIGS. 3A and 3B, the landing undercarriage 7 is constituted by a pair of, right and left landing skids.

Referring to FIGS. 2A to 3B, flight states (hovering, forward flight, right turning, left turning) of the vertical take-off and landing aircraft 1 will be explained. As illustrated in the figures, it is assumed here that the vertical take-off and landing aircraft 1 is flying with only the pilot M (single occupant) seated on the front seat unit 5a.

To hover, the pilot M manipulates the control sticks 6 so that the drive shafts of the propulsion mechanism 2 (fans 21) may be directed substantially vertically, as shown in FIG. 2A. Because of such manipulation, the thrust of the propulsion mechanism 2 acts upon the fuselage only as lift, so that no thrust can be developed in the fuselage. Also, during hovering, the output of the engine 3 is adjusted so that the lift exerted by the propulsion mechanism 2 and the gravity of the fuselage may be substantially equal to each other. Hovering refers to a state in which the vertical take-off and landing aircraft 1 remains stationary in the air, and when the aircraft 1 climbs or descends vertically during take-off or landing, it assumes an attitude substantially identical with that during hovering. Specifically, during take-off, the output of the engine 3 is adjusted so that the lift exerted by the propulsion mechanism 2 may be greater than the gravity of the fuselage, and during landing, the output of the engine 3 is adjusted so that the lift exerted by the propulsion mechanism 2 may be smaller than the gravity of the fuselage.

To fly forward, as illustrated in FIG. 2B, the pilot M pulls the control sticks 6 toward his/her body such that the frame 4, that is, the propulsion mechanism 2 (fans 21) is tilted forward with respect to the seating 5. Because of such manipulation, the propulsion mechanism 2 (fans 21) ejects air obliquely backward, so that the fuselage can be moved forward by a forward component of the thrust of the propulsion mechanism 2. To fly straight ahead, the output of the engine 3 may be adjusted so that the vertical component (lift) of the thrust of the propulsion mechanism 2 may be nearly equal to the gravity of the fuselage.

To turn to the right, as illustrated in FIG. 3A, the pilot M shifts his/her body weight to the right side (left side in FIG. 3A), to roll the fuselage to the right. Such manipulation makes it possible to generate thrust directed to the left side of the fuselage, so that the aircraft can turn to the right.

To turn to the left, as illustrated in FIG. 3B, the pilot M shifts his/her body weight to the left side (right side in FIG. 3B), to roll the fuselage to the left. Such manipulation makes it possible to produce thrust directed to the right side of the fuselage, so that the aircraft can turn to the left.

Figure 4A:
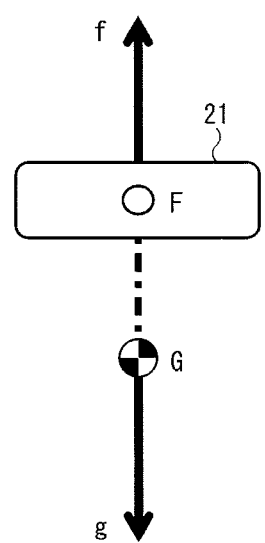
FIG. 4A illustrates the principle of flight during hovering of the vertical take-off and landing aircraft of the first embodiment, as viewed from one side of fans.
Figure 4B:
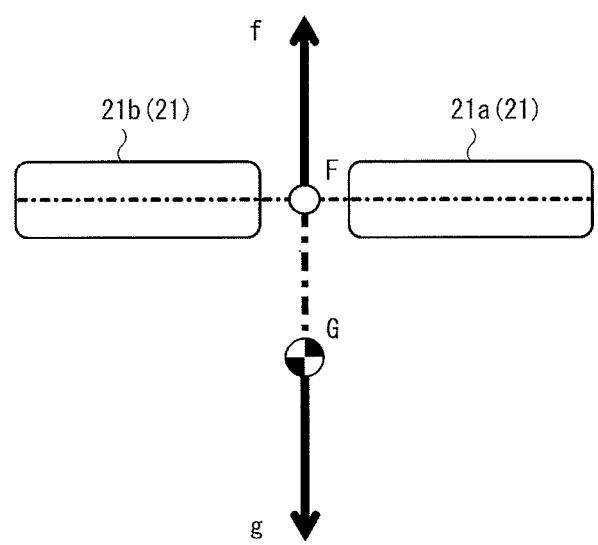
FIG. 4B illustrates the principle of flight during hovering of the vertical take-off and landing aircraft of the first embodiment, as viewed from the front of the fans.
Figure 4C:
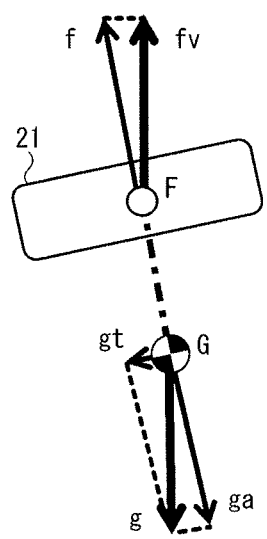
FIG. 4C illustrates the flight principle of the vertical take-off and landing aircraft of the first embodiment in a state in which disturbance has occurred during hovering, as viewed from one side of the fans.
Figure 4D:
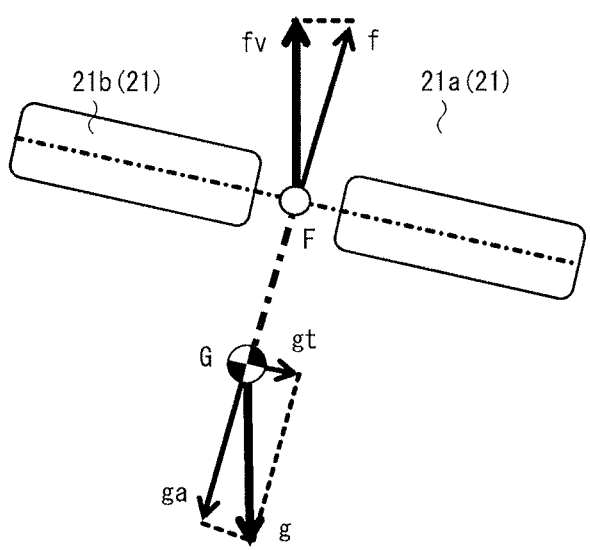
FIG. 4D illustrates the flight principle of the vertical take-off and landing aircraft of the first embodiment in a state in which disturbance has occurred during hovering, as viewed from the front of the fans.
Figure 5A:
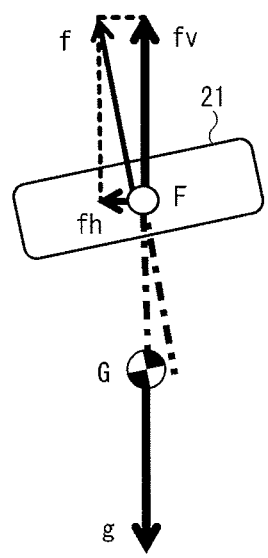
FIG. 5A illustrates the principle of forward flight of the vertical take-off and landing aircraft of the first embodiment, as viewed from one side of the fans.
Figure 5B:
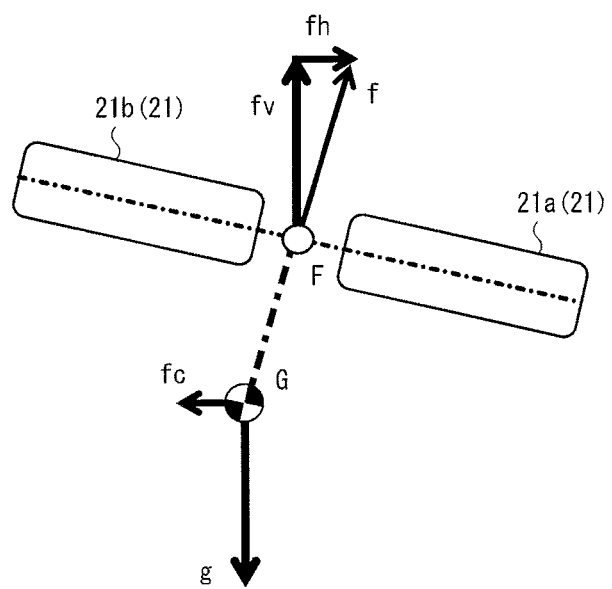
FIG. 5B illustrates the principle of flight during left turning of the vertical take-off and landing aircraft of the first embodiment, as viewed from the front of the fans.

The flight principle of the aforementioned vertical take-off and landing aircraft 1 will now be explained with reference to FIGS. 4A to 5B. FIGS. 4A to 4D illustrate the flight principle of the vertical take-off and landing aircraft according to the first embodiment, wherein FIG. 4A illustrates a hovering state as viewed from one side of the fans, FIG. 4B illustrates a hovering state as viewed from the front of the fans, FIG. 4C illustrates a state in which disturbance has occurred during hovering, as viewed from one side of the fans, and FIG. 4D illustrates a state in which disturbance has occurred during hovering, as viewed from the front of the fans. FIGS. 5A and 5B illustrate the flight principle of the vertical take-off and landing aircraft according to the first embodiment, wherein FIG. 5A illustrates a forward flight state as viewed from one side of the fans, and FIG. 5B illustrates a left turning state as viewed from the front of the fans.

In these figures, illustration of the fuselage other than the fans 21 is omitted, the center of gravity of the fuselage is indicated at G, and the point of action of the lift is indicated at F. In the vertical take-off and landing aircraft 1 of the first embodiment, the point F of action is located above the center G of gravity. In FIGS. 4A, 4C and 5A, the forward end (nose) of the fuselage is located on the left side of the fans, and the tail of the fuselage is located on the right side of the fans. On the other hand, in FIGS. 4B, 4D and 5B, the right-hand parts of the figures correspond to the left side of the fuselage, and the left-hand parts of the figures correspond to the right side of the fuselage.

FIGS. 4A and 4B illustrate the principle of flight during hovering. During hovering, as illustrated in the side and front views of FIGS. 4A and 4B, the drive shafts of the fans 21 are directed vertically, and a fuselage axis FG connecting the point F of action and the center G of gravity is also directed vertically. At this time, the fans 21 generate thrust f directed vertically upward, and the thrust f acts upon the fuselage as lift. Also, the fuselage exerts gravity g directed vertically downward. During hovering, the thrust f (lift) and the gravity g have the same magnitude and thus are balanced.

FIGS. 4C and 4D illustrate the principle of flight in a state where disturbance has occurred during hovering. First, suppose that as shown in the side view of FIG. 4C, the fuselage pitches with its nose down (declines leftward in the figure) during hovering due to disturbance such as wind. In such a case, the drive shafts of the fans 21 and the fuselage axis FG are tilted forward. At this time, the vertical component fv of the thrust f generated by the fans 21 acts upon the fuselage as lift, and the vertical component fv (lift) is adjusted so as to balance with the gravity g. Also, since the fuselage axis FG is tilted forward, the gravity g can be resolved into an axial component ga in the direction of the fuselage axis FG and a tilt component gt. The tilt component gt moves the center G of gravity forward with respect to the point F of action and thus acts upon the fuselage as a righting moment.

Let it now be assumed that as shown in the front view of FIG. 4D, the fuselage rolls to the left (to the right in the figure) during hovering due to disturbance such as wind. Also in this case, the vertical component fv (lift) of the thrust f is adjusted so as to balance with the gravity g, and the tilt component gt of the gravity g moves the center G of gravity leftward with respect to the point F of action and thus acts upon the fuselage as a righting moment.

FIG. 5A illustrates the principle of forward flight. FIG. 5A is a side view of the fans. As illustrated in FIG. 5A, during forward flight, the drive shafts of the fans 21 are tilted forward (leftward in the figure) with respect to the fuselage axis FG, and the fans 21 generate thrust f in the direction of their drive shafts. At this time, the vertical component fv of the thrust f acts upon the fuselage as lift, and the vertical component fv (lift) is adjusted so as to balance with the gravity g. Also, the horizontal component fh of the thrust f forces the fuselage axis FG to move forward and thus acts upon the fuselage as thrust, so that the fuselage moves (flies) forward.

FIG. 5B illustrates the principle of flight during left turning. FIG. 5B is a front view of the fans. During left turning, as illustrated in FIG. 5B, the drive shafts of the fans 21 and the fuselage axis FG are tilted leftward (rightward in the figure). At this time, the vertical component fv of the thrust f generated by the fans 21 acts upon the fuselage as lift, and the vertical component fv (lift) is adjusted so as to balance with the gravity g. Also, the horizontal component fh of the thrust f acts as a centripetal force to move the point F of action leftward, and a centrifugal force fc acts as a reaction to the centripetal force to move the center G of gravity rightward. As a result, the fuselage turns to the left while maintaining its attitude. The principle of flight during right turning is identical with the aforementioned principle of flight during left turning, except that the right and left sides are reversed, and therefore will not be explained here.

Figure 6A:
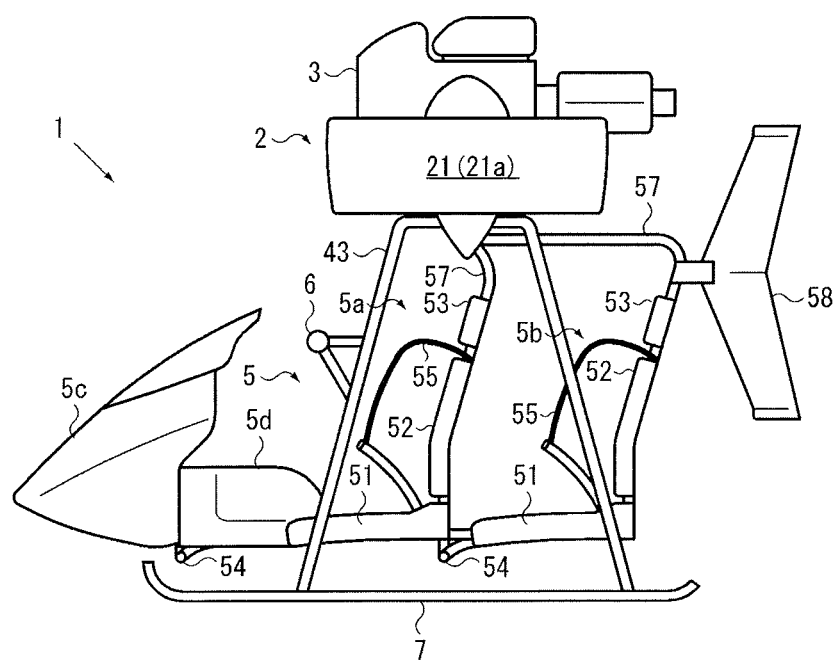
FIG. 6A is a side view showing an entire fuselage of a vertical take-off and landing aircraft according to a second embodiment of the present invention.
Figure 6B:
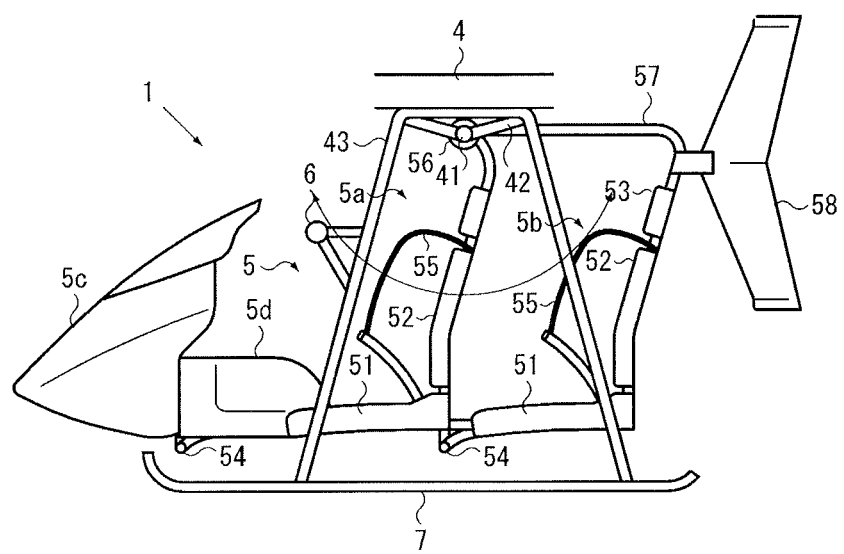
FIG. 6B is a side view showing the positional relationship of seating and a frame of the vertical take-off and landing aircraft according to the second embodiment of the present invention.
Figure 6C:
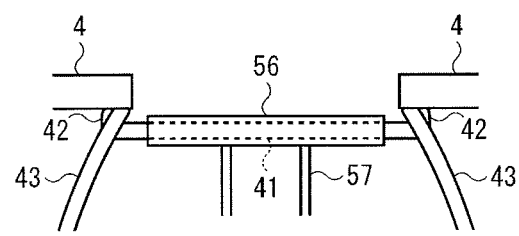
FIG. 6C is an enlarged view of a hinge section of the vertical take-off and landing aircraft according to the second embodiment of the present invention.

A vertical take-off and landing aircraft 1 of a second embodiment, which flies on the same flight principle as the aforementioned flight principle, will now be described with reference to FIGS. 6A to 6C. FIGS. 6A to 6C illustrate the vertical take-off and landing aircraft according to the second embodiment of the present invention, wherein FIG. 6A is a side view showing an entire fuselage, FIG. 6B is a side view showing the positional relationship between seating and a frame, and FIG. 6C is an enlarged view of a hinge section. Identical reference signs are used to denote component parts identical with those of the aforementioned vertical take-off and landing aircraft 1 according to the first embodiment, and explanation of such component parts is omitted.

In the vertical take-off and landing aircraft 1 of the second embodiment illustrated in FIGS. 6A to 6C, the landing skids 7 as the undercarriage are coupled to the frame 4. By connecting the landing skids 7 to the frame 4 instead of the seating 5, it is possible to reduce the weight of the seating 5 and thus to lessen the load applied to the hinge (pivot shaft 41 and tubular member 56). Specifically, the landing skids 7 are connected to supporting frames 43 which in turn are connected to the frame 4. The supporting frames 43 are each a generally trapezoidal frame, for example, and the landing skids 7 are so arranged as to form the lower bases of the respective trapezoids. Also, as seen from FIG. 6C showing upper portions of the supporting frames 43, the spacing between the right and left supporting frames 43 widens in a downward direction such that supporting frames 43 are located on both sides of the seating 5. The control sticks 6 may be connected to the supporting frames 43.

Figure 7A:
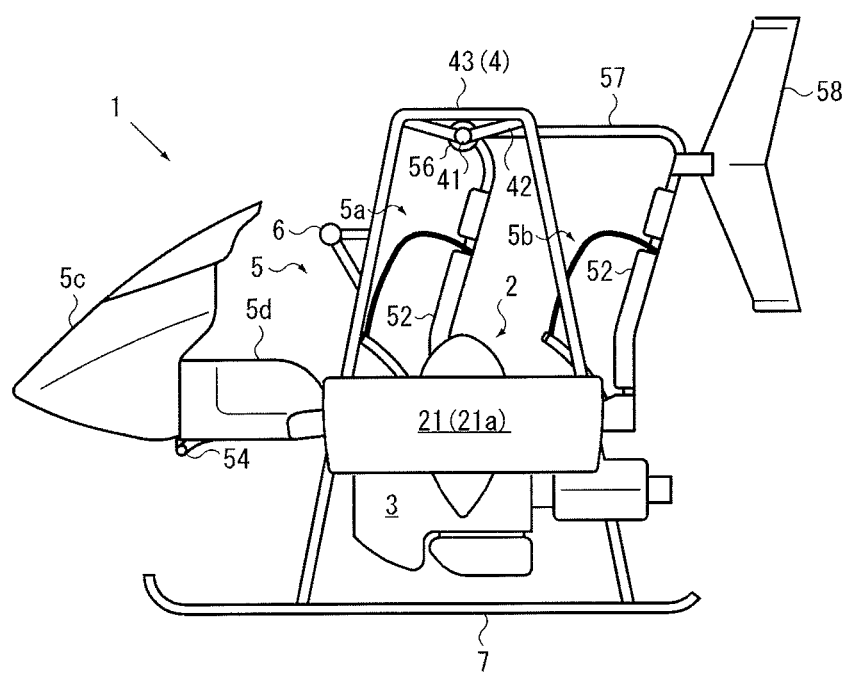
FIG. 7A is a side view showing an entire fuselage of a vertical take-off and landing aircraft according to a third embodiment of the present invention.
Figure 7B:
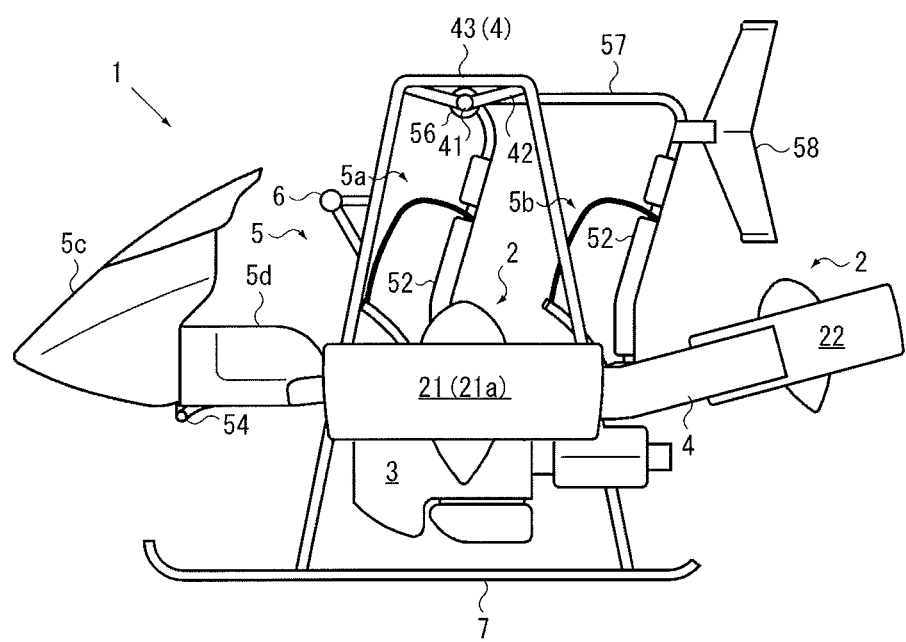
FIG. 7B is a side view showing an entire fuselage of a vertical take-off and landing aircraft according to a fourth embodiment of the present invention.

Vertical take-off and landing aircraft 1 according to other embodiments of the present invention will now be described with reference to FIGS. 7A and 7B. FIGS. 7A and 7B illustrate the vertical take-off and landing aircraft according to the other embodiments of the present invention, wherein FIG. 7A is a side view showing an entire fuselage of the vertical take-off and landing aircraft according to a third embodiment, and FIG. 7B is a side view showing an entire fuselage of the vertical take-off and landing aircraft according to a fourth embodiment. Identical reference signs are used to denote component parts identical with those of the aforementioned vertical take-off and landing aircraft 1 according to the first or second embodiment, and explanation of such component parts is omitted.

In the vertical take-off and landing aircraft 1 of the third embodiment illustrated in FIG. 7A, the engine 3 is arranged below the seating 5, and the propulsion mechanism 2 (fans 21) is arranged in an adjacent position adjacent to the seating 5. For the other parts, the vertical take-off and landing aircraft 1 is identical in configuration with that of the second embodiment, and therefore, detailed description of the other parts is omitted. Although not illustrated, the propulsion mechanism 2 (fans 21) may alternatively be arranged in an adjacent position adjacent to the engine 3 located below the seating 5 such that the propulsion mechanism 2 is also located below the seating 5.

In the vertical take-off and landing aircraft 1 of the fourth embodiment illustrated in FIG. 7B, the propulsion mechanism 2 additionally includes a rear fan 22 arranged at the back of the seating 5. For the other parts, the vertical take-off and landing aircraft 1 is identical in configuration with that of the third embodiment, and therefore, detailed description of the other parts is omitted. The rear fan 22 is, for example, a ducted fan smaller in size than the fans 21 (left and right fans 21a and 21b). Where a single fan is mounted as the rear fan 22, for example, the left and right fans 21a and 21b and the rear fan 22 are arranged in positions coinciding with the respective vertices of a triangle, and the frame 4 is configured to constitute the three sides of the triangle. On the other hand, where two rear fans 22 are mounted, for example, the left and right fans 21a and 21b and the two rear fans 22 are arranged in positions corresponding to the respective vertices of a quadrangle (e.g. square, rectangle, or trapezoid), and the frame 4 is configured to constitute the four sides of the quadrangle.

The drive shaft(s) of the rear fan(s) 22 may be arranged so as to be parallel with the drive shafts of the fans 21 (left and right fans 21a and 21b) or may alternatively be arranged so as to be tilted forward as illustrated. Where the fans 21 are arranged below the seating 5 or in adjacent positions adjacent to the seating 5, the fans 21 and the rear fans 22 may be arranged such that their drive shafts are tilted inward, that is, the fans 21 and the rear fans 22 respectively form a generally V shape when viewed from the front, in order to facilitate the maintenance of static stability.

Figure 8A:
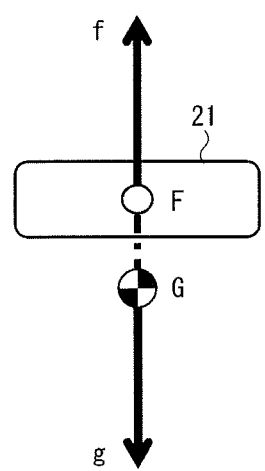
FIG. 8A illustrates the principle of flight during hovering of the vertical take-off and landing aircraft of the third embodiment, as viewed from one side of fans.
Figure 8B:
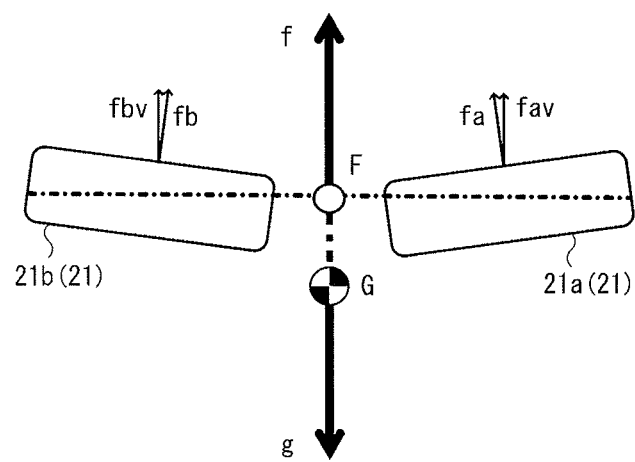
FIG. 8B illustrates the principle of flight during hovering of the vertical take-off and landing aircraft of the third embodiment, as viewed from the front of the fans.
Figure 8C:
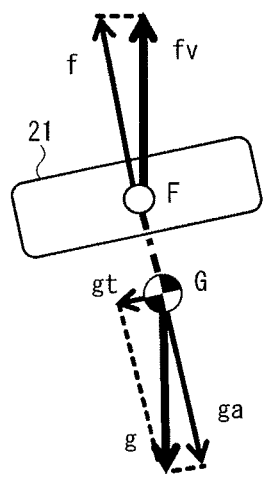
FIG. 8C illustrates the flight principle of the vertical take-off and landing aircraft of the third embodiment in a state in which disturbance has occurred during hovering, as viewed from one side of the fans.
Figure 8D:
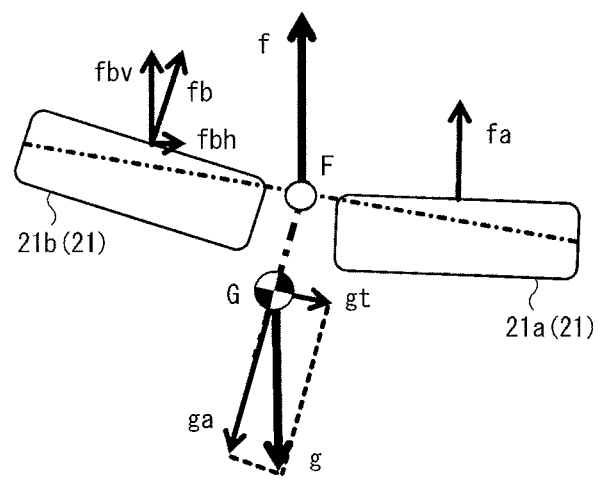
FIG. 8D illustrates the flight principle of the vertical take-off and landing aircraft of the third embodiment in a state in which disturbance has occurred during hovering, as viewed from the front of the fans.
Figure 9A:
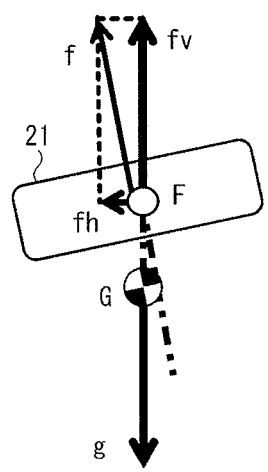
FIG. 9A illustrates the principle of forward flight of the vertical take-off and landing aircraft of the third embodiment, as viewed from one side of the fans.
Figure 9B:
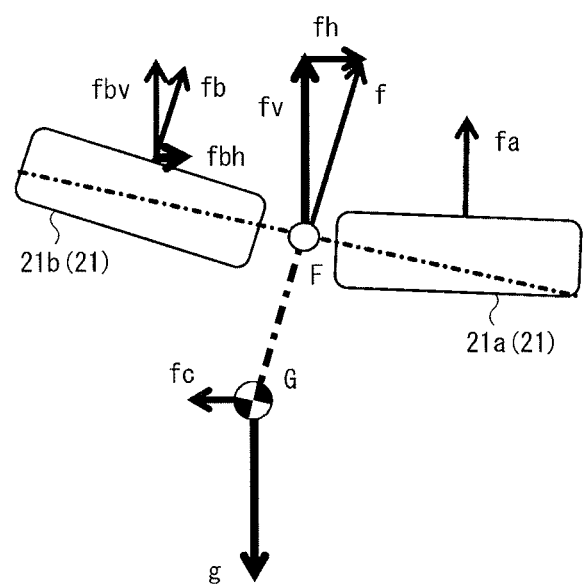
FIG. 9B illustrates the principle of flight during left turning of the vertical take-off and landing aircraft of the third embodiment, as viewed from the front of the fans.

Referring now to FIGS. 8A to 9B, the flight principle of the vertical take-off and landing aircraft 1 according to the third embodiment will be explained. FIGS. 8A to 8D illustrate the flight principle of the vertical take-off and landing aircraft according to the third embodiment, wherein FIG. 8A illustrates a hovering state as viewed from one side of the fans, FIG. 8B illustrates a hovering state as viewed from the front of the fans, FIG. 8C illustrates a state in which disturbance has occurred during hovering, as viewed from one side of the fans, and FIG. 8D illustrates a state in which disturbance has occurred during hovering, as viewed from the front of the fans. FIGS. 9A and 9B illustrate the flight principle of the vertical take-off and landing aircraft according to the third embodiment, wherein FIG. 9A illustrates a forward flight state as viewed from one side of the fans, and FIG. 9B illustrates a left turning state as viewed from the front of the fans.

In these figures, illustration of the fuselage other than the fans 21 is omitted, the center of gravity of the fuselage is indicated at G, and the point of action of the lift is indicated at F. In the vertical take-off and landing aircraft 1 of the third embodiment, the center G of gravity is located slightly below the point F of action. Also, the fans 21 (left and right fans 21a and 21b) are so arranged as to form a generally V shape when viewed from the front. In FIGS. 8A, 8C and 9A, the forward end (nose) of the fuselage is located on the left side of the fans, and the tail of the fuselage is located on the right side of the fans. On the other hand, in FIGS. 8B, 8D and 9B, the right-hand parts of the figures correspond to the left side of the fuselage, and the left-hand parts of the figures correspond to the right side of the fuselage.

FIGS. 8A and 8B illustrate the principle of flight during hovering. As illustrated in the side and front views of FIGS. 8A and 8B, during hovering, the drive shafts of the fans 21 are directed vertically, and the fuselage axis FG connecting the point F of action and the center G of gravity is also directed vertically. At this time, the fans 21 generate thrust f directed vertically upward, and the thrust f acts upon the fuselage as lift. As illustrated in the front view of FIG. 8B, the thrust f of the fans 21 is obtained as a resultant force of thrust fa of the left fan 21a and thrust fb of the right fan 21b. Also, the fuselage exerts gravity g directed vertically downward. During hovering, the thrust f (lift) and the gravity g have the same magnitude and thus are balanced.

FIGS. 8C and 8D illustrate the principle of flight in a state where disturbance has occurred during hovering. First, suppose that as shown in the side view of FIG. 8C, the fuselage pitches with its nose down (declines leftward in the figure) during hovering due to disturbance such as wind. In such a case, the drive shafts of the fans 21 and the fuselage axis FG are tilted forward. At this time, the vertical component fv of the thrust f generated by the fans 21 acts upon the fuselage as lift, and the vertical component fv (lift) is adjusted so as to balance with the gravity g. Also, since the fuselage axis FG is tilted forward, the gravity g can be resolved into an axial component ga in the direction of the fuselage axis FG and a tilt component gt. The tilt component gt moves the center G of gravity forward with respect to the point F of action and thus acts upon the fuselage as a righting moment.

Let it now be assumed that as shown in the front view of FIG. 8D, the fuselage rolls to the left (to the right in the figure) during hovering due to disturbance such as wind. Also in this case, the vertical component fv (lift) of the thrust f is adjusted so as to balance with the gravity g, and the tilt component gt of the gravity g moves the center G of gravity leftward with respect to the point F of action and thus acts upon the fuselage as a righting moment. Since the fans 21 (left and right fans 21a and 21b) are arranged so as to form a generally V shape, the thrust fa generated by the left fan 21a is directed nearly vertically, whereas the thrust fb generated by the right fan 21b acts in a direction inclined inward. Accordingly, the thrust fa of the left fan 21a acts upon the fuselage as lift, and the vertical component fbv of the thrust fb of the right fan 21b also acts upon the fuselage as lift. Where the thrust f of the left fan 21a and that of the right fan 21b are adjusted to be of the same magnitude, then the relation of thrust fa>vertical component fbv holds. The lift difference (fa−fbv) serves as a force to push the left fan 21a upward and thus acts upon the fuselage as a righting moment.

FIG. 9A illustrates the principle of forward flight. FIG. 9A is a side view of the fans. As illustrated in FIG. 9A, during forward flight, the drive shafts of the fans 21 are tilted forward (leftward in the figure) with respect to the fuselage axis FG, and the fans 21 generate thrust f in the direction of their drive shafts. At this time, the vertical component fv of the thrust f acts upon the fuselage as lift, and the vertical component fv (lift) is adjusted so as to balance with the gravity g. Also, the horizontal component fh of the thrust f forces the fuselage axis FG to move forward and thus acts upon the fuselage as thrust, so that the fuselage moves (flies) forward.

FIG. 9B illustrates the principle of flight during left turning. FIG. 9B is a front view of the fans. During left turning, as illustrated in FIG. 9B, the fuselage axis FG is inclined leftward (rightward in the figure). Also, since the fans 21 (left and right fans 21a and 21b) are arranged so as to form a generally V shape, the thrust fa generated by the left fan 21a is directed nearly vertically, whereas the thrust fb generated by the right fan 21b acts in a direction inclined inward. At this time, the thrust fa of the left fan 21a acts upon the fuselage as lift, and the vertical component fbv of the thrust fb of the right fan 21b also acts upon the fuselage as lift. Thus, the vertical component fv (i.e. resultant force of the thrust fa and the vertical component fbv) of the thrust f (resultant force of the thrust fa and the thrust fb) of the fans 21 acts upon the fuselage as lift, and the vertical component fv (lift) is adjusted so as to balance with the gravity g. Also, the horizontal component fh of the thrust f, that is, the horizontal component fbh of the thrust fb of the right fan 21b, acts as a centripetal force to move the point F of action leftward, and a centrifugal force fc acts as a reaction to the centripetal force to move the center G of gravity rightward. As a result, the fuselage turns to the left while maintaining its attitude. The principle of flight during right turning is identical with the aforementioned principle of flight during left turning, except that the right and left sides are reversed, and therefore will not be explained here.

Figure 10A:
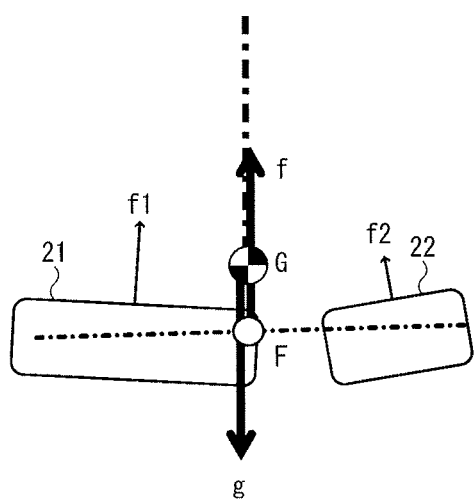
FIG. 10A illustrates the principle of flight during hovering of the vertical take-off and landing aircraft of the fourth embodiment, as viewed from one side of fans.
Figure 10B:
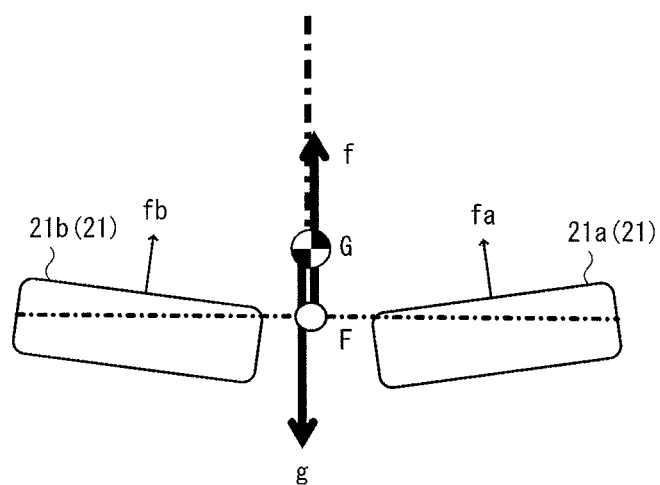
FIG. 10B illustrates the principle of flight during hovering of the vertical take-off and landing aircraft of the fourth embodiment, as viewed from the front of the fans.
Figure 10C:
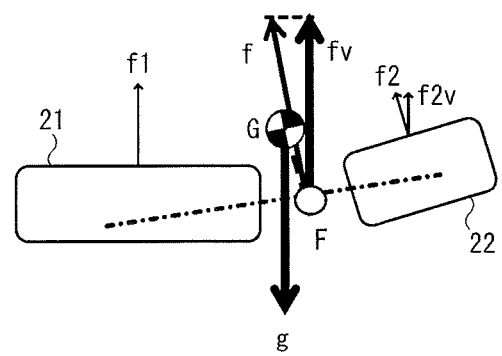
FIG. 10C illustrates the flight principle of the vertical take-off and landing aircraft of the fourth embodiment in a state in which disturbance has occurred during hovering, as viewed from one side of the fans.
Figure 10D:
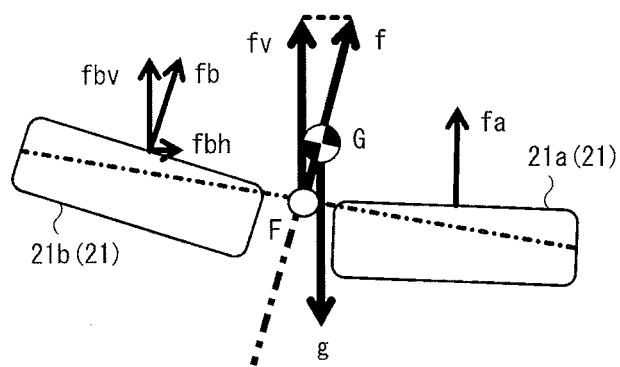
FIG. 10D illustrates the flight principle of the vertical take-off and landing aircraft of the fourth embodiment in a state in which disturbance has occurred during hovering, as viewed from the front of the fans.
Figure 11A:
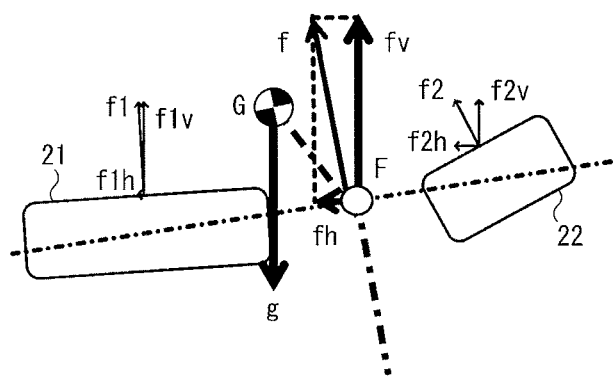
FIG. 11A illustrates the principle of forward flight of the vertical take-off and landing aircraft of the fourth embodiment, as viewed from one side of the fans.
Figure 11B:
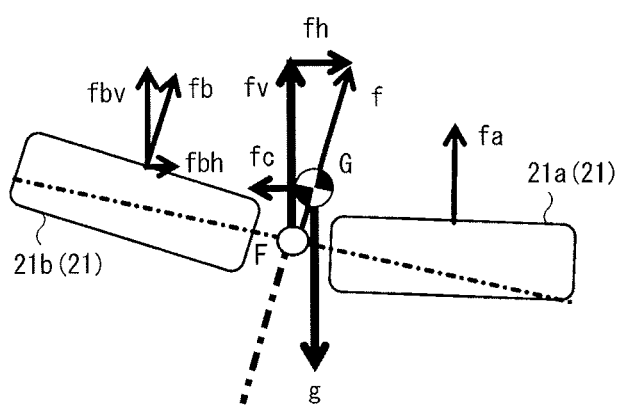
FIG. 11B illustrates the principle of flight during left turning of the vertical take-off and landing aircraft of the fourth embodiment, as viewed from the front of the fans.

Referring now to FIGS. 10A to 11B, the flight principle of the vertical take-off and landing aircraft 1 according to the fourth embodiment will be explained. FIGS. 10A to 10D illustrate the flight principle of the vertical take-off and landing aircraft according to the fourth embodiment, wherein FIG. 10A illustrates a hovering state as viewed from one side of the fans, FIG. 10B illustrates a hovering state as viewed from the front of the fans, FIG. 10C illustrates a state in which disturbance has occurred during hovering, as viewed from one side of the fans, and FIG. 10D illustrates a state in which disturbance has occurred during hovering, as viewed from the front of the fans. FIGS. 11A and 11B illustrate the flight principle of the vertical take-off and landing aircraft according to the fourth embodiment, wherein FIG. 11A illustrates a forward flight state as viewed from one side of the fans, and FIG. 11B illustrates a left turning state as viewed from the front of the fans.

In these figures, illustration of the fuselage other than the fans 21 and the rear fan 22 is omitted, the center of gravity of the fuselage is indicated at G, and the point of action of the lift is indicated at F. In the vertical take-off and landing aircraft 1 of the fourth embodiment, the center G of gravity is located slightly above the point F of action. Also, the fans 21 (left and right fans 21a and 21b) are so arranged as to form a generally V shape when viewed from the front. Further, the rear fan 22 is arranged so as to be tilted forward with respect to the fans 21. In FIGS. 10A, 10C and 11A, the forward end (nose) of the fuselage is located on the left side of the right and left fans, and the tail of the fuselage is located on the right side near the rear fan. On the other hand, in FIGS. 10B, 10D and 11B, the right-hand parts of the figures correspond to the left side of the fuselage, and the left-hand parts of the figures correspond to the right side of the fuselage.

FIGS. 10A and 10B illustrate the principle of flight during hovering. During hovering, as illustrated in the side and front views of FIGS. 10A and 10B, the attitude of the fuselage is adjusted such that the resultant force of thrust f1 of the fans 21 and thrust f2 of the rear fan 22 acts upon the point F of action as vertical thrust f. Specifically, the drive shafts of the fans 21 are kept tilted backward, whereas the drive shaft of the rear fan 22 is kept tilted forward. As illustrated in the front view of FIG. 10B, the thrust f1 of the fans 21 is obtained as a resultant force of the thrust fa of the left fan 21a and the thrust fb of the right fan 21b. The fuselage axis FG connecting the point F of action and the center G of gravity is directed vertically, and the fuselage exerts gravity g directed vertically downward. During hovering, the thrust f (lift) and the gravity g have the same magnitude and thus are balanced.

FIGS. 10C and 10D illustrate the principle of flight in a state where disturbance has occurred during hovering. First, let it be assumed that as shown in the side view of FIG. 10C, the fuselage pitches with its nose down (declines leftward in the figure) during hovering due to disturbance such as wind. In such a case, the thrust f, which is the resultant force of the thrust f1 of the fans 21 and the thrust f2 of the rear fan 22, and the fuselage axis FG are inclined forward. At this time, the vertical component fv of the thrust f acts upon the fuselage as lift, and the vertical component fv (lift) is adjusted so as to balance with the gravity g. Also, since the fans 21 and the rear fan 22 are tilted forward, the lift (vertical component of the thrust f1) of the fans 21 increases, whereas the vertical component f2v of the thrust f2 of the rear fan 22 decreases. Consequently, the increment in the lift of the fans 21 acts so as to push the nose of the fuselage upward, and the decrement in the lift of the rear fan 22 acts so as to push the tail of the fuselage downward. That is, such variations in the lift forces act upon the fuselage as a righting moment. The figure illustrates the case where the thrust f1 of the fans 21 is directed vertically.

Let it now be assumed that as shown in the front view of FIG. 10D, the fuselage rolls to the left (in the figure, to the right) during hovering due to disturbance such as wind. Also in this case, the vertical component fv (lift) of the thrust f is adjusted so as to balance with the gravity g. Since the fans 21 (left and right fans 21a and 21b) are arranged so as to form a generally V shape, and also since the left and right fans 21a and 21b are titled leftward, the lift (vertical component of the thrust fa) of the left fan 21a increases, whereas the vertical component fbv of the thrust fb of the right fan 21b decreases. Accordingly, the increment in the lift of the left fan 21a acts so as to push the left side of the fuselage upward, and the decrement in the lift of the right fan 21b acts so as to push the right side of the fuselage downward. That is, such variations in the lift forces act upon the fuselage as a righting moment. The figure illustrates the case where the thrust fa of the left fan 21a is directed vertically.

FIG. 11A illustrates the principle of forward flight. FIG. 11A is a side view of the fans. As illustrated in FIG. 11A, during forward flight, the fuselage axis FG remains inclined forward (leftward in the figure), so that the drive shafts of the fans 21 and rear fan 22 are also tilted forward. At this time, the thrust f1 of the fans 21 can be resolved into a vertical component f1v and a horizontal component f1h, and the thrust f2 of the rear fan 22 can be resolved into a vertical component f2v and a horizontal component f2h. The resultant force of the vertical components f1v and f2v constitutes the vertical component fv of the thrust f, and the vertical component fv (lift) is adjusted so as to balance with the gravity g. Also, the resultant force of the horizontal components f1h and f2h constitutes the horizontal component fh of the thrust f and acts upon the fuselage as thrust, so that the fuselage moves (flies) forward.

FIG. 11B illustrates the principle of flight during left turning. FIG. 11B is a front view of the fans. During left turning, as illustrated in FIG. 11B, the fuselage axis FG is inclined leftward (rightward in the figure). Also, since the fans 21 (left and right fans 21a and 21b) are arranged so as to form a generally V shape, the thrust fa generated by the left fan 21a is directed nearly vertically, whereas the thrust fb generated by the right fan 21b acts in a direction inclined inward. At this time, the thrust fa of the left fan 21a acts upon the fuselage as lift, and the vertical component fbv of the thrust fb of the right fan 21b also acts upon the fuselage as lift. Thus, the vertical component fv (i.e. resultant force of the thrust fa and the vertical component fbv) of the thrust f (resultant force of the thrust fa and the thrust fb) of the fans 21 acts upon the fuselage as lift, and the vertical component fv (lift) is adjusted so as to balance with the gravity g. Also, the horizontal component fh of the thrust f, that is, the horizontal component fbh of the thrust fb of the right fan 21b, acts as a centripetal force to move the point F of action leftward, and a centrifugal force fc acts as a reaction to the centripetal force to move the center G of gravity rightward. As a result, the fuselage turns to the left while maintaining its attitude. The action of the rear fan 22 is not taken into consideration here for convenience of explanation. The principle of flight during right turning is identical with the aforementioned principle of flight during left turning, except that the right and left sides are reversed, and therefore will not be explained here.

The present invention is not limited to the foregoing embodiments and may of course be modified in various ways without departing from the scope of the invention.

REFERENCE SIGNS LIST

1: vertical take-off and landing aircraft
2: propulsion mechanism
3: engine
4: frame
5: seating
5a: front seat unit
5b: rear seat unit
6: control stick
7: landing undercarriage
21: fan
22: rear fan
41: pivot shaft
56: tubular member

The invention claimed is:

1. A vertical take-off and landing aircraft comprising:
a propulsion mechanism configured to generate lift and thrust;
an engine configured to supply motive power to the propulsion mechanism;
a frame coupling the propulsion mechanism and the engine;
seating connected to and suspended from the frame so as to be swingable back and forth relative to the frame;
a control stick connected to the frame; and
a landing undercarriage connected to the frame or the seating, wherein:
the propulsion mechanism is connected to the frame such that a drive shaft of the propulsion mechanism is directed vertically during landing,
the frame has a pivot shaft extending in a horizontal direction, and the seating has a tubular member through which the pivot shaft is inserted,
the frame is moved relative to the seating by manipulating the control stick, during flight, to change orientation of the propulsion mechanism and the engine, and
the propulsion mechanism includes a left fan arranged on the left side of the seating, and a right fan arranged on the right side of the seating.

2. The vertical take-off and landing aircraft according to claim 1, wherein the seating includes a front seat unit and a rear seat unit.

3. The vertical take-off and landing aircraft according to claim 1, wherein the propulsion mechanism further includes a rear fan arranged at the back of the seating.

4. The vertical take-off and landing aircraft according to claim 1, wherein the propulsion mechanism is arranged above or below the seating.

5. The vertical take-off and landing aircraft according to claim 1, wherein the propulsion mechanism is arranged adjacent to the seating.

6. The vertical take-off and landing aircraft according to claim 1, wherein the left and right fans of the propulsion mechanism are ducted fans.

\* \* \* \* \*